Figure 1:
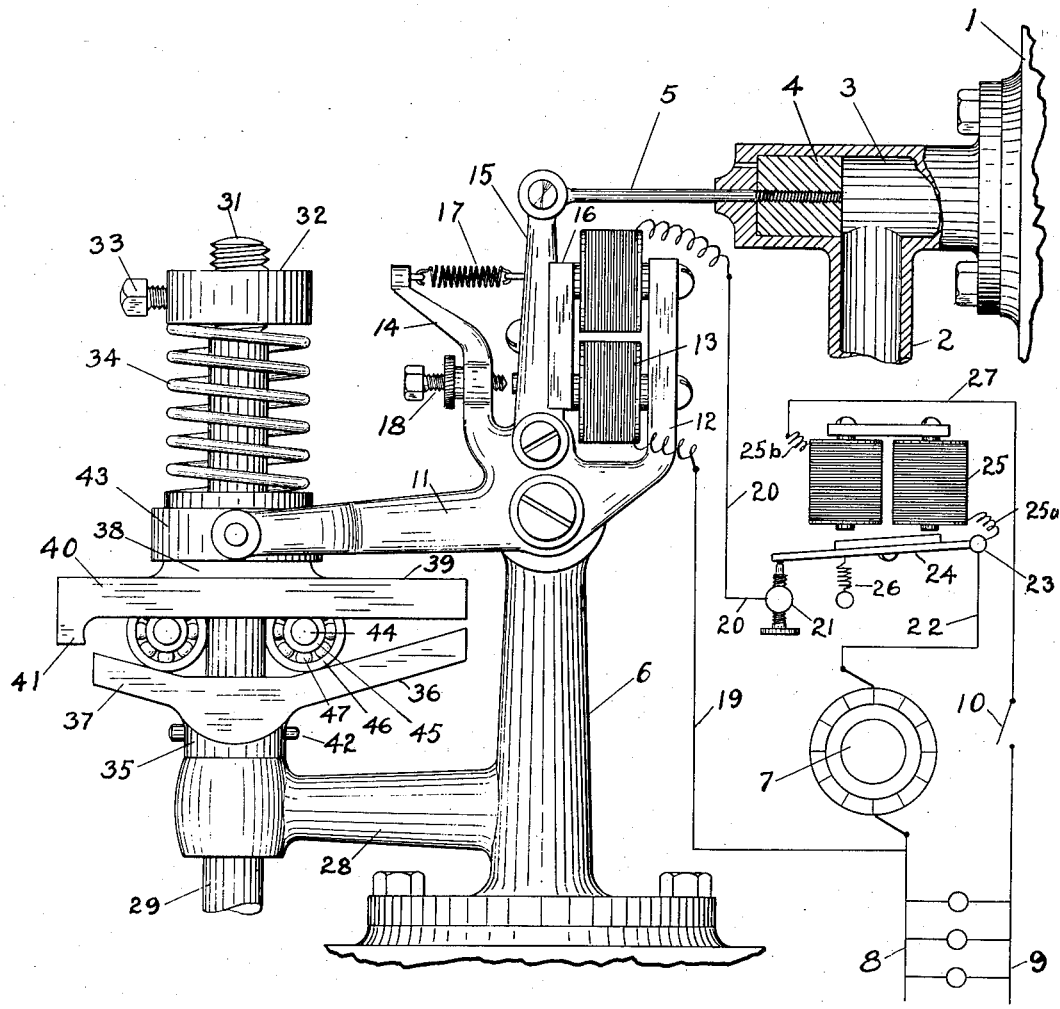

P. OKEY.
GOVERNING DEVICE.
APPLICATION FILED JAN. 2, 1912.

1,178,596.

Patented Apr. 11, 1916.
2 SHEETS—SHEET 2.

Witnesses
G. C. Drumm
A. L. Phelps

Inventor
Perry Okey
By C. C. Shepherd
Attorney

UNITED STATES PATENT OFFICE.

PERRY OKEY, OF COLUMBUS, OHIO.

GOVERNING DEVICE.

1,178,596. Specification of Letters Patent. Patented Apr. 11, 1916.

Application filed January 2, 1912. Serial No. 668,993.

*To all whom it may concern:*

Be it known that I, PERRY OKEY, a citizen of the United States, residing at Columbus, in the county of Franklin and State of Ohio, have invented certain new and useful Improvements in Governing Devices, of which the following is a specification.

My invention relates to a governing device for engines in general and engine driven dynamos in particular and is particularly directed to the provision of a governing structure having two distinct speed stages of effective operation, each stage being complete in itself. This is designed to effect a saving of the fuel and wear upon the engine when the dynamo is under no load by automatically lowering the operating speed and in effectuation of this result, my governing structure is operative within a certain range of low speed of the engine and is complete in its governing action within this range. When any load is connected to the dynamo my governing structure automatically causes the engine to accelerate up to a predetermined speed, and to automatically reëstablish the governing action, and in such reestablishment to effect or institute a second and complete governing action.

A further important object of my invention resides in the provision of a structure of governing device for engines which includes a governor transmission mechanism adjustable to assume a position of government for a low engine speed and a position of government for high engine speed, together with means automatically responsive to the throwing on or off of the engine load to adjust this mechanism from one position of government to the other. I do not desire to limit myself to absolutely no load in the above statement, but it is intended that the governor structure shall be utilized in connection with speeds whereby the engine load ranges between extremely wide limits and not merely for such fluctuations in loads as may occur in heavily worked plants where various machines or circuits are intermittently thrown on or off.

In this connection, it is my object to adapt my invention to dynamo circuits wherein the governor mechanism is automatically adjusted for government at its various stages by the throwing on or off of the external dynamo load as the case may be.

My invention is desirably utilized in the control of the valve of the engine driving the dynamo, and contemplates, in addition to a centrifugally actuated mechanism, a valve leverage mechanism which is capable of holding the valve in either of two definite positions with relation to the position of the centrifugally actuated weights. More specifically, when the valve leverage mechanism is in one position the valve will be caused to complete its full length of travel while the centrifugal weights move through the inner half of their range, and when the valve leverage mechanism is in the other position, the valve will be caused to complete its full travel when the centrifugal weights move through the outer half of their range. When the leverage mechanism is in what may be termed the normal state of adjustment, the governor will respond or begin to respond to a comparatively high or great number of revolutions per minute of the engine shaft. When the leverage mechanism is in its abnormal state of adjustment, the valve will come under regulation at a comparatively low rate of speed or a comparatively few number of revolutions per minute of the engine shaft. It will be seen from this that the engine may be governed completely while running at low speed which is amply sufficient when the dynamo is without load. When a load is placed upon the dynamo the leverage mechanism is automatically adjusted for high speed of the engine and will effect a complete regulation of the engine at high speed. In conjunction with this adjustable leverage mechanism, I utilize a peculiar form of governor which is effective, not only to maintain the two independent ranges of governing action, but to positively and definitely create a space between such complete governing ranges. My preferred method of so spacing the ranges of governing action, is by the provision of a centrifugal governor of such a form that certain of its weights are arrested in their movement outward, from a central point when acted on by centrifugal force. These are arrested at a speed which constitutes the upper limit of the low range of speed of the engine. When these certain weights are arrested in their outward movements, the governing effect of the governor is eliminated until the engine has accelerated to a rotative speed which will have raised the centrifugal effect of the unchecked weights to a value equal to that of all the weights before certain of them were stopped, when the governor will again resume its function. The structure preferably utilized by me to produce these functions noted will be more amply described in the following specification.

My invention goes one step further in that it not only provides independent stages of governing regulation and spaces such stages; but, it determinately spaces such governing regulation and by such determinate spacing definitely marks out the rate of speed at which the governing action for the low speed shall cease, and the rate of speed at which the governing regulation of the high speed shall be instituted.

A more explicit presentation of the operation of my invention may be given by the explanation that the leverage mechanism for the valve is desirably automatically maintained in its abnormal position under electro-magnetic control from the dynamo when the work circuit of such dynamo is cut out. As heretofore explained, this leverage mechanism in its abnormal position is intermediately operative to govern the engine in its low speed stage. When the work circuit is cut in, the leverage mechanism automatically resumes normal position and in consequence the governing action is thenceforth confined to the high speed stage of the engine. From this explanation, it will be apparent that the engine begins to accelerate immediately upon the cutting in of the work circuit of the dynamo. Were it not for the peculiar structure and operation of the governor proper, this acceleration of speed would be through an exceedingly small range. However, by the arresting of certain of the weights of the centrifugal governor and by making these weights of a determinately greater mass than those which continue unchecked, I am enabled to definitely space these independent stages of governing action to any desired degree.

An important structural feature of my invention resides in the peculiar form of governor utilized. This governor is most satisfactorily embodied as converging track elements which are forced apart by centrifugally movable wedge elements, to which elements such centrifugal movement is imparted by a drive from the engine. These elements may be weights of any type, but are desirably in the form of rollers comprised of oppositely rotatable parts, so rotated by independent frictional contact with the converging tracks in their outward movement. It will be understood that the movement of one or more of these track elements controls the valve of the engine. The opposite rotatory movement of these parts is particularly effective to eliminate friction in a manner to be described.

The preferred embodiment of my invention is shown in the accompanying drawings, in which similar characters of reference designate corresponding parts, and in which—

Figure 2:
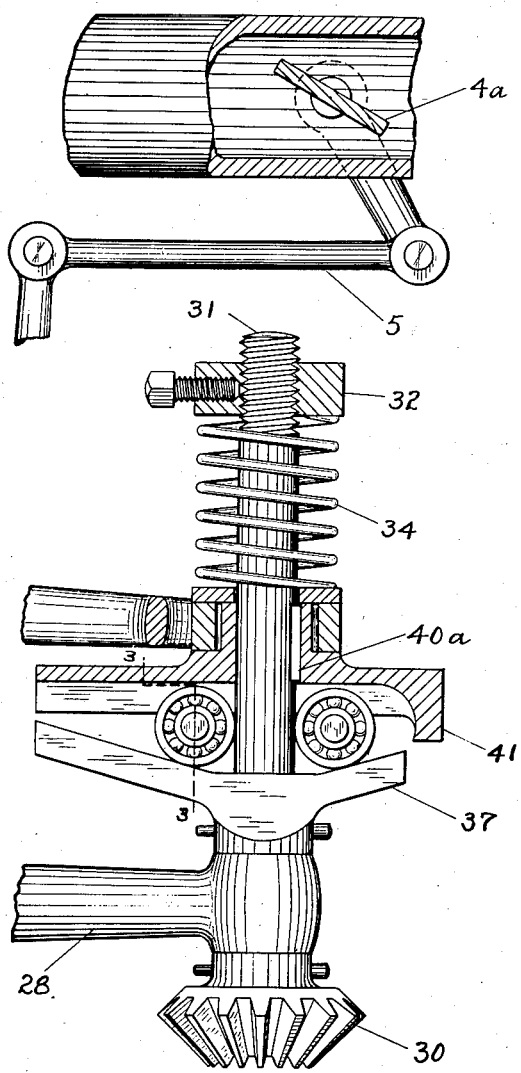
Figure 5:
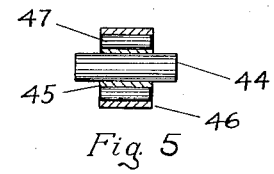
Figure 4:
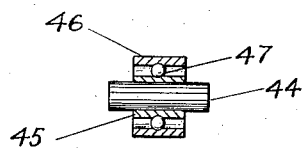
Figure 3:
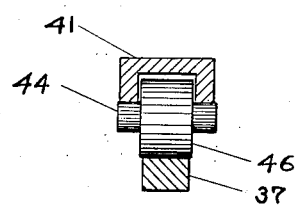

Figure 1 is a side elevation partially broken away of my governing structure showing a diagrammatic representation of the dynamo and working circuit in operative relation thereto, Fig. 2 is an elevation of my governing structure partially broken away, Fig. 3 is a vertical section taken on line 3—3 of Fig. 2, Fig. 4 is a vertical section taken through one of the roller weight elements of a form desirably utilized by me, and, Fig. 5 is a similar section of a modified form of weight roller.

In the drawings, the engine body is shown at 1 and in conjunction therewith there is shown an inlet passage 2, a valve chamber 3 and a valve 4 desirably of a reciprocating nature, although the valve shown in Fig. 2 and designated 4ᵃ is of the butterfly type. Whatever may be the type of the valve, it is desirably directly under the control of a lever element or elements 5 and leverage mechanism carried from the engine body by a bracket 6. The dynamo which is driven by the engine is diagrammatically shown as at 7 and connected therewith is a work circuit indicated by numerals 8 and 9 and cut in or out by a switch 10.

Mounted upon the bracket 6 is a pivoted element having a yoke arm 11 extending to the governor to be hereinafter described, a substantially vertical arm 12 carrying an electro-magnet 13, and an intermediate arm 14. Pivotally carried upon this pivotally supported element between the electro-magnet 13 and the arm 14 is an arm 15 extending in a substantially vertical direction and connected to the lever element or elements 5. The arm 15 carries an armature 16 for coaction with the electro-magnet 13 and shown in its position of rest when all current is shut off and the engine is not running, as held against the electro-magnet by the governor spring which is necessarily stronger than a coil spring or other resilient element 17 secured thereto and to the arm 14 at its opposite extremity. The exact position of the arm 15 in its retracted state, is governed by a set screw element 18 carried by the arm 14. Similar positions of the various elements obtain when the engine is running below the speed point of initial action of the governor at the low speed stage when no current is being used in the work circuit.

Extending from one side of the electro-magnet is the conducting element 19 leading to the dynamo and extending from the other side of the electro-magnet is the conducting element 20 leading to the contact or binding post 21, while from the opposite side of the dynamo there extends the line 22 leading to the pivot post 23 of an armature 24 operating in conjunction with and under the control of electro-magnet 25, but normally held away from said electro-magnet by a spring 26 which holds the said armature normally against the contact 21. This normal condition presents itself when the work circuit is cut out by the opening of the switch element 10 and under these conditions, there is a closed circuit from the dynamo 7 through the line 22, contact support 23, armature 24, binding post or contact 21, line 20, electro-magnet 13 and line 19. The electro-magnet 13, being energized, attracts the armature 16 carried by the arm 15 and moves such arm into abnormal position against the tension of the spring 17. It will be understood that these are the existing conditions when the working circuit is cut out and it is consequently desired to run the engine at a low rate of speed, at the same time subjecting said engine to a complete governing action. Closing of the switch element 10 cuts in the work circuit and energizes electro-magnet 25 which is in series therewith by connections 25$^a$ and 25$^b$. This immediately results in attraction of the armature 24 which breaks the circuit through electro-magnet 13 and permits the arm 15 to return to normal position upon its supporting element under the tension of spring 17. Under these conditions, a circuit is closed through dynamo 7, working circuit 8 and 9, line 27 and electro-magnet 25 through connections 25$^b$ and 25$^a$ to pivot contact 23 and line 22. The immediate result is the stepping up of the governing action, so as to render it applicable to the high speed stage. This necessarily results because of the different relative positions of the valve with that of the centrifugal actuating weights as hereinbefore described.

The governor mechanism operating in conjunction with the mechanism just described, is desirably supported from the bracket 6 by a laterally extending arm 28 and is comprised of a shaft 29 rotatable under the control of the engine by means of any form of gearing, an example being shown at 30. This rotating shaft is threaded at its upper end as at 31 for the adjustable reception of an internally threaded collar 32 adapted to be locked in place by a set screw 33.

My governor is of peculiar form in that it comprises independent weight members coacting with complemental track members, the whole controlling valve leverage mechanism acting against the regulated tension or resistance of a coil spring 34. In the specific construction shown, there are superposed trackways and the lower one of these trackways is shown at 35 as having a long track 36 and a short track 37, the cross sectional form of said tracks being shown best in Fig. 3. From such view it will be apparent that this track is a single one and such is my preferred construction. The upper trackway is carried by the element 38 which is formed with a long double track 39 and a short double track 40 with a stirrup 41 depending therefrom. The lower of the superposed elements is rigidly secured to the rotatable shaft 29 in any preferred manner and the manner of securing this element is shown at 42. The upper element 38 is slidably secured on the shaft by the feather 40$^a$. This upper element has a circumferential groove formed therein for the reception of an encircling collar 43, to which is pivotally secured the yoke 11$^a$ of the yoke arm 11. One of the essential features of this structure resides in the relative direction of the tracks 36 and 39 and 37 and 40. It is essential that these tracks converge as they retreat from the central shaft 29. This convergence may be produced in any manner and in the present embodiment I have shown the lower tracks 36 and 37 inclined upwardly. Operating between and upon said tracks are independent roller elements desirably of a form similar to that shown in Figs. 4 and 5. In these figures it will be apparent that the roller elements each comprise an axle 44 carrying a ball race 45, an annular rim 46 and interposed ball or roller elements 47. By reference to Fig. 3, it will be seen that the axles of these roller elements run upon the double trackways 39 or 40, while the rim of each roller element runs either upon the trackway 36 or 37.

In operation of the governor proper, it will be seen that the rotation of the shaft 29, driven by the engine, will inevitably cause movement due to centrifugal action of the roller weights. In the movement outwardly of such weights, the axle will rotate inwardly because of its frictional contact with the double trackway and the rim will rotate outwardly because of its frictional contact with the single trackway. Outward movement of these roller elements, will result in a wedging action due to the relative convergence of the tracks and the upper of the superposed elements will be raised against the tension of the regulable resistance spring 34. This upward movement will be transmitted through the leverage mechanism to the valve and will thereby effect a governing of the speed of the engine.

The act of the weights moving on their tracks causes the outer member to rotate in one direction and the inner member in the opposite, hence the use of anti-friction bearings at this point, which is the only one wherein movement occurs under stress of centrifugal force opposed by the spring.

The separate and independent stages of government hitherto mentioned are effected in the following manner: Continued outward movement of the roller elements brings one of such elements into contact with the depending stirrup 41. Before proceeding further it may be well to state that the description and showing deals with a governor using two pairs of tracks and two weights, one for each pair of tracks. The number of the tracks and weights may, of course, be varied at will. Proceeding with the explanation of the operation, a contact of one of the weights with the depending stirrup 41, serves to arrest further outward movement of this weight while the other weight is unimpeded. Thus, above the speed which carries the one roller to the stirrup, the governing effect is eliminated and the engine will accelerate until the centrifugal component of the single weight equals that of the two weights before the movement of one was arrested. This creates the independent stages of governing action. In the actual operation of my invention, I provide the weights which are to be caught by the stirrups of a greater mass than the weights which are unimpeded in their outward movement and by definitely proportioning the masses of these different weights, I regulate the variance between the high and low speed stages.

The coöperative function of my whole invention as described, is as follows: The engine is running at low speed and driving the dynamo, preferably all the time, although this is a matter of choice. When the work circuit is cut out, the dynamo is unloaded and the circuit through the electro-magnet 13 is closed. The governor acts through the leverage mechanism to control the position of the valve and such control is desirably complete for the low speed of the engine, all the centrifugal weights being then in action. Closure of the switch element 10 may be considered equivalent to the cutting in of any lamp or other apparatus. This immediately results in a return of the arm 15 to normal position preparatory to the control of the engine in its high speed stage. The engine immediately begins to accelerate because of the throwing open of the valve due to the release of the arm 15 and such acceleration of the engine causes an increased outward movement of the weights. However, at this time, one or more of the weights is checked in a manner hitherto described and the governing action being transferred to the unimpeded weight or weights, the acceleration of the engine continues, until it is at a sufficiently high rate to again commence movement of the unimpeded weight or weights outwardly. This is the interval during which the governing effect is eliminated. At the speed when the unimpeded weights have become centrifugally equivalent to the combination of such unimpeded weights together with the checked weights, the high speed stage of government commences and from then on the inlet of fuel is again under control of the governor. Thus by variant regulations of the mass of the weights, length of their tracks, strength of the resisting spring and relative change of position of the pivoted arm 15 or by any change in one or more of these elements or features of my invention, I am enabled to obtain practically any two distinct stages of speed desired and to completely govern each stage and further to obtain such governing action automatically.

From the above description and specification, it will be apparent that I have provided a governing device which is particularly suitable in coöperative action with a dynamo and work circuit therefor, in such a manner as to permit of idly running the engine and dynamo at a low speed, with a great saving in fuel and wear and that the placing of a load upon the dynamo is automatically effective to step up the speed of the engine to give normal voltage at the dynamo terminals. This action is desirably entirely automatic and both the high and low stages of speed of the engine are subjected to complete governing control. In conjunction with these features of improvement, I consider that one of the elements of the mechanism which I have shown and described constitutes, in itself, a vast improvement in the art. This improvement is the independent roller weight structure. This independent roller weight structure is particularly important in the present invention because of the reduction of friction which necessarily results and this is about equally true with regard to a governor put to general use.

What I claim, is—

1. A governing device comprising a structure for giving the governing effect, and means for automatically suspending the governing effect at a certain speed, said structure automatically reëstablishing the governing effect at a higher speed.

2. A governing device comprising a centrifugally operated structure for giving the governing effect, and means for suspending the governing effect at a certain speed, said structure automatically reëstablishing the governing effect at a higher speed.

3. A governing device comprising a centrifugally operated structure for giving the governing effect, and means for automatically eliminating a portion of the centrifugal effect at a certain speed, said structure permitting the reëstablishment of the governing effect at a higher speed.

4. In a governing device, the combination with a plurality of centrifugally operable elements for giving the governing effect, of means for eliminating the centrifugal effect of certain of said elements at a predetermined speed of rotation.

5. In a governing device, the combination with a plurality of centrifugally operable elements for giving the governing effect, of means for eliminating the centrifugal effect of certain of said elements at a predetermined speed of rotation, the remainder of said elements continuing the governing effect when the speed of rotation has increased sufficiently to give the remaining elements a centrifugal effect overcoming that eliminated.

6. In a governing device the combination with a multiplicity of centrifugally movable elements, of means for arresting such movement of part of said elements at a predetermined speed rotation.

7. In a governing device, the combination with a plurality of centrifugally operable elements, of means for arresting the governing movement of certain of said elements at a predetermined speed of rotation, the remainder of said elements remaining free for governing movement.

8. In a governing device the combination with a multiplicity of movable centrifugally operated elements, means for arresting the movement of part of said elements at a predetermined speed of rotation, and means for permitting a continuance of movement of the remainder of said elements at a higher predetermined rotative speed.

9. In a governing device, complemental elements forced toward each other by a regulable resistance element, radially movable wedge centrifugal elements between said elements, and a control controllable by movements of certain of said wedge elements to the exclusion of the remainder.

10. In a governing device, the combination with a plurality of centrifugally movable elements, certain of said elements being of a determinately greater mass than the remainder of said elements, of means for arresting the movement of the said certain elements at a predetermined rotative speed.

11. In a governing device, the combination with a plurality of centrifugally movable elements, controlling means resisting the movement of said elements, and elements on said means for arresting the movement of part of said centrifugally movable elements at a predetermined rotative speed.

12. In a governing device, the combination with a plurality of centrifugally movable elements, controlling means comprising converging track members adapted to be forced apart by outward movement of said centrifugally movable elements, means for resisting such separation, means for regulating said resistance means, and means for stopping the movement of part of said elements at a predetermined speed.

13. In a governing device, the combination with a plurality of centrifugally movable elements, controlling means comprising converging track members adapted to be forced apart by movement of said centrifugally movable elements outwardly therebetween, and means for stopping the movement of part of said elements at a predetermined speed.

14. In a governing device, the combination with a plurality of movable centrifugal elements, controlling means comprising converging track members adapted to be forced apart by movement of said centrifugally movable elements outwardly therebetween, and a stirrup formed on one end of the said members to check and eliminate the effect of certain of said elements at a predetermined speed.

15. A governor comprising relatively movable converging track members, connections between one of said members and the engine control, centrifugally movable elements for moving said first elements relatively, means for checking certain of said centrifugally movable elements, said certain elements being of a definitely greater weight than the unimpeded elements.

16. In a governing device, the combination with a plurality of movable centrifugal elements, controlling means comprising converging track members adapted to be forced apart by movement of said centrifugally movable elements outwardly therebetween, and a stirrup formed on one of the said members to check and eliminate the effect of certain of said elements at a predetermined speed, said checked elements being of a definitely greater weight than the unimpeded elements.

17. The combination with an engine throttling structure and a governor structure therefor, connecting transmission mechanism between said two structures, and means for simultaneously temporarily freeing said throttling structure from government and shifting said throttling structure to a position of greater opening, said throttling structure being again restored to governing influence at a higher rotative engine speed.

18. The combination with an engine throttling structure and a governor structure therefor, connecting transmission mechanism between said two structures, and means for simultaneously temporarily freeing said throttling structure from government and shifting said throttling structure to a position of lesser opening, said throttling structure being again restored to governing influence at a lower rotative engine speed.

19. The combination with an engine throttling structure and a governor structure therefor, connecting transmission mechanism between said two structures, and means for simultaneously freeing said throttling structure from government and shifting said throttling structure to a position of either greater or lesser opening, said throttling structure being again restored to governing influence at either a higher or a lower rotative engine speed.

20. The combination with an engine throttling structure and a two stage governor structure therefor, said governor structure being capable of governing at a low and a high engine speed, connecting transmission mechanism between said two structures, and means for shifting said throttling structure to a position of either high or low engine speed and simultaneously transferring the governing connection of said connecting mechanism to the high or low governing stage of said governor structure.

21. The combination with an engine throttling structure and a two stage governor structure therefor, said governor structure being capable of governing at a low and a high engine speed, connecting transmission mechanism between said two structures, and means for shifting said throttling structure from a position of low engine speed to a high engine speed and simultaneously transferring the governing connection of said mechanism to the high governing stage of said governor structure.

22. The combination with an engine throttling structure and a two stage governor structure therefor, said governor structure being capable of governing at a low and a high engine speed, connecting transmission mechanism between said two structures, and means for shifting said throttling structure from a position of high to a position of low engine speed and simultaneously transferring the governing connection of said mechanism to the low governing stage of said governor structure.

23. The combination with an engine throttling structure and a governor therefor, a dynamo driven by said engine, a connecting transmission mechanism between said structure and said governor adjustable to assume two positions with respect to said governor, and electro-magnetic means for automatically effecting such adjustment by the closure of a circuit through said dynamo.

24. The combination with an engine throttling structure and a governor therefor, a dynamo driven by said engine, a connecting transmission mechanism between said structure and said governor adjustable to assume two positions with respect to said governor, and electro-magnetic means for automatically effecting such adjustment by the throwing of a load on said dynamo.

25. A governing device for engines comprising a governor transmission mechanism adjustable to assume a position of government for a low engine speed and a position of government for a high engine speed, a governor structure operatively connected to said mechanism, and electro-magnetic means for adjusting said mechanism from one position of government to the other.

26. A governing device for engines comprising a governor transmission mechanism adjustable to assume a position of government for a low engine speed and a position of government for a high engine speed, a governor structure operatively connected to said mechanism, and means automatically responsive by the changing of the engine load to adjust said mechanism from one position of government to the other.

27. A governing device for engine driven dynamos comprising a governor transmission mechanism adjustable to assume a position of government for a low engine speed and a position of government for a high engine speed, a governor structure connected to said mechanism, and electro-magnetic means energized by being thrown in circuit with said dynamo for adjusting said mechanism from one position of government to the other.

28. A governing device for engine driven dynamos comprising a governor transmission mechanism adjustable to assume a position of government for a low engine speed and a position of government for a high engine speed, a governor structure connected to said mechanism, and electro-magnetic means automatically energized by being thrown in circuit with said dynamo by a change in the external load of said dynamo for adjusting said mechanism from one position of government to the other.

29. A governing device for engines comprising a governor transmission mechanism adjustable to assume a position of government for a low engine speed and a position of government for a high engine speed, a governor structure operatively connected to said mechanism, and means automatically responsive by the throwing on or throwing out of the external engine load to adjust said mechanism from one position of government to the other.

30. In combination with an engine and a dynamo driven thereby, a governing device comprising means automatically operable by the closing or opening of a circuit through said dynamo for completely governing the engine in two distinct ranges of speed with an ungoverned interim.

31. In combination with an engine and a dynamo driven thereby, governing means for governing said engine to run at both a low, no-load speed and a high, load speed, and electromagnetic means automatically operable upon being thrown in circuit with said dynamo to step the government from one of said speeds to the other.

32. In a governing device, the combination of an engine, a dynamo driven thereby, a throttle valve for the engine, an electro-magnet connected in circuit with the dynamo, a centrifugally operated governor for the engine, electro-magnetic means for changing the relation between the position of the throttle valve and the position of the centrifugally actuated weights of the governor when the magnet in circuit with the dynamo is deënergized, whereby the engine is caused to rotate at a different speed.

33. In a governing device, the combination of an engine, a dynamo driven thereby, a throttle valve for the engine, an electro-magnet connected in the work circuit of the dynamo, a centrifugally operated governor for the engine, electro-magnetic means for changing the relation between the position of the throttle valve and the position of the centrifugally actuated weights of the governor when the magnet in the work circuit of the dynamo is energized whereby the engine is caused to rotate at a different speed.

34. In a governing device, a valve, a leverage mechanism operatively connected to said valve and adjustable with it to assume two positions with relation to the governor, said two positions being a high speed and a low speed with an ungoverned interim and electro-magnetic means for effecting such adjustment.

35. In a governing device, a valve, a leverage mechanism operatively connected to said valve and adjustable with it to assume two positions with relation to the governor, said two positions being a high speed and a low speed with an ungoverned interim and electro-magnetic means for automatically effecting such adjustment.

36. In a governing device, a valve, a leverage mechanism comprising an arm operatively connected to said valve and constructed and adjustably operative with it to assume two positions with relation to the governor, said two positions being a high speed and a low speed with an ungoverned interim and electro-magnetic means for effecting such adjustment.

37. In a governing device for engines, the combination with centrifugally operated weights of two relatively rotatable parts, balls or rollers between the parts, a track for the periphery of the outer member to roll on, a track for the inner member to roll on, the tracks receding from each other as they approach their center of rotation, and a resisting element opposing the outward movement of the weights.

38. In a governor, valve leverage mechanism, a plurality of opposing track elements, and roller weights for forcing said elements apart, said roller weights being formed of oppositely rotatable parts operatively engaging said opposing track elements.

39. In a governor, valve leverage mechanism, a plurality of opposing track elements, roller weights for forcing said elements apart, said roller weights being formed of oppositely rotatable parts running on opposite elements, and anti-friction bearings between the said oppositely rotatable parts.

40. A governing device comprising a governing structure, speed controlling means connected to said structure, and electro-magnetic means operable in conjunction with said structure and said first-named means to effect a complete governing action in two distinct ranges of speed.

41. A governing device for engines comprising means having a complete governing action at a low and high speed, said means being adjustable to temporarily free the engine from government from one speed until the other speed is reached, and means automatically responsive to a changed load upon the engine to effect such adjustment.

42. A governing device for engines comprising means having a complete governing action at a low and high speed, said means being adjustable to temporarily free the engine from government from one speed until the other speed is reached, and electro-magnetic means automatically effecting such adjustments when energized or deënergized.

43. In combination with a lighting circuit and an engine driven dynamo, a governing device comprising means automatically operative by cutting in or out of the lighting circuit for completely governing the engine in two distinct ranges of speed with an ungoverned interim.

44. A governing device for a prime mover comprising a structure for giving the governing effect when said prime mover is running under no load, and means automatically responsive by the throwing on of a load to eliminate the governing effect, said structure automatically reëstablishing the governing effect at a higher speed.

45. A governing device for a prime mover comprising a structure for giving the governing effect when said prime mover is running under no load, means automatically responsive to the throwing on of a load to eliminate the low speed government and establish a government at a high speed.

46. A governing device for a prime mover comprising a structure for giving the governing effect when said prime mover is running at high speed under load, and electro-magnetic means operative to eliminate the high speed governing effect and establish a governing at a low speed when the load is thrown off.

47. In combination with an engine and a dynamo driven thereby, means for governing said engine when running at high load or a low no load speed, and electro-magnetic means rendered effective by the closure of a circuit therethrough to cause a governing of said engine at the low speed.

48. In combination with an engine and a dynamo driven thereby, means for governing said engine when running at high load or low no load speed, and electro-magnetic means rendered effective by the closure of a circuit therethrough from said dynamo to cause a governing of said engine at the low speed.

49. In combination with an engine and a dynamo driven thereby, a governing device for said engine comprising a structure for giving a governing effect at one speed, and electro-magnetic means in circuit with said dynamo for eliminating the governing effect whenever said electro-magnetic circuit is broken, said structure automatically reestablishing the governing effect at a higher speed.

50. In combination with an engine and dynamo driven thereby, governing means arranged to govern said engine at a high and at a low speed, and electro-magnetic means forming a portion of said governing means and connected with said dynamo, said electro-magnetic means when in circuit with said dynamo causing a governing at one of the speeds.

51. In combination with an engine and dynamo driven thereby, governing means arranged to govern said engine at a high and at a low speed, and electro-magnetic means forming a portion of said governing means and connected with said dynamo, said electro-magnetic means when in circuit with said dynamo causing a governing at one of the speeds, the change of government from one speed to the other being effected automatically by the completion or breaking of said circuit.

In testimony whereof I affix my signature in presence of two witnesses.

PERRY OKEY.

Witnesses:
HARRY H. COCKLEY,
NEWTON JONES.